United States Patent
Kim et al.

(10) Patent No.: US 9,479,351 B2
(45) Date of Patent: Oct. 25, 2016

(54) METHOD AND APPARATUS FOR PROVIDING VOICE SERVICE IN COMMUNICATION SYSTEM

(71) Applicant: Samsung Electronics Co., Ltd., Gyeonggi-do (KR)

(72) Inventors: Young-Jip Kim, Gyeonggi-do (KR); Gyou-Hwan Kim, Gyeonggi-do (KR); Jung-Gi Kim, Gyeonggi-do (KR); Han-Seok Kim, Seoul (KR); Woon-Kyun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 14/368,291

(22) PCT Filed: Dec. 21, 2012

(86) PCT No.: PCT/KR2012/011281
§ 371 (c)(1),
(2) Date: Jun. 23, 2014

(87) PCT Pub. No.: WO2013/095051
PCT Pub. Date: Jun. 27, 2013

(65) Prior Publication Data
US 2014/0376443 A1    Dec. 25, 2014

(30) Foreign Application Priority Data

Dec. 23, 2011 (KR) .......................... 10-2011-0141660

(51) Int. Cl.
*H04L 12/18* (2006.01)
*H04W 76/00* (2009.01)
(Continued)

(52) U.S. Cl.
CPC .......... *H04L 12/189* (2013.01); *H04M 7/0075* (2013.01); *H04W 76/002* (2013.01); *H04W 84/12* (2013.01); *H04W 88/08* (2013.01)

(58) Field of Classification Search
None
See application file for complete search history.

(56) References Cited

U.S. PATENT DOCUMENTS

| 6,993,021 B1 * | 1/2006 | Chuah ..................... H04L 29/06 370/389 |
| 2003/0053434 A1 * | 3/2003 | Chow ..................... H04W 4/10 370/338 |

(Continued)

FOREIGN PATENT DOCUMENTS

| EP | 1667397 A1 | 6/2006 |
| EP | 1968262 B1 | 9/2008 |

(Continued)

OTHER PUBLICATIONS

International Search Report dated Apr. 8, 2013 in connection with International Patent Application No. PCT/KR2012/011281, 3 pages.

(Continued)

*Primary Examiner* — Chi H Pham
*Assistant Examiner* — Vladislav Agureyev

(57) ABSTRACT

An apparatus and method for providing/receiving a voice service in a Wireless Local Access Network (WLAN) system. In the voice service provision method, an Access Point (AP) generates a multiplexing voice data packet by performing a multiplexing operation on at least two voice data packets among received voice data packets, and performs a multicast operation of multicasting the multiplexing voice data packet to Mobile Stations (MSs) which should receive the at least two voice data packets.

32 Claims, 7 Drawing Sheets

(51) Int. Cl.
  *H04W 84/12*  (2009.01)
  *H04M 7/00*  (2006.01)
  *H04W 88/08*  (2009.01)

(56) References Cited

U.S. PATENT DOCUMENTS

| | | | |
|---|---|---|---|
| 2004/0266440 A1* | 12/2004 | Fuchs | H04L 12/1836 455/445 |
| 2006/0126604 A1* | 6/2006 | Kim | H04L 29/06027 370/356 |
| 2006/0133372 A1 | 6/2006 | Cheong et al. | |
| 2007/0086380 A1 | 4/2007 | Lim et al. | |
| 2007/0091805 A1* | 4/2007 | Ramprashad | H04L 47/10 370/230.1 |
| 2008/0049703 A1* | 2/2008 | Kneckt | H04W 68/00 370/342 |
| 2008/0084878 A1* | 4/2008 | Akbar | H04L 12/1886 370/390 |
| 2009/0046617 A1 | 2/2009 | Tenny et al. | |
| 2009/0080361 A1* | 3/2009 | Song | H04L 12/185 370/312 |
| 2010/0118754 A1* | 5/2010 | Burton | H04L 12/185 370/312 |
| 2010/0309814 A1* | 12/2010 | Wang | H04L 12/1818 370/254 |
| 2013/0007287 A1* | 1/2013 | Chu | H04L 12/189 709/227 |

FOREIGN PATENT DOCUMENTS

| | | |
|---|---|---|
| EP | 2059000 A1 | 5/2009 |
| KR | 10-2007-0042851 | 4/2007 |

OTHER PUBLICATIONS

Written Opinion of International Searching Authority dated Apr. 8, 2013 in connection with International Patent Application No. PCT/KR2012/011281, 5 pages.

Wei Wang, et al., "A Multiplex-Multicast Scheme that Improves System Capacity of Voice-over-IP on Wireless LAN by 100%", IEEE, 2004, pp. 472-477.

* cited by examiner

METHOD AND APPARATUS FOR PROVIDING VOICE SERVICE IN COMMUNICATION SYSTEM

CROSS-REFERENCE TO RELATED APPLICATION(S)

The present application claims priority under 35 U.S.C. §365 to International Patent Application No. PCT/KR2012/011281 filed Dec. 21, 2012, entitled "METHOD AND APPARATUS FOR PROVIDING CONTENTS IN COMMUNICATION SYSTEM". International Patent Application No. PCT/KR2012/011281 claims priority under 35 U.S.C, §365 and/or 35 U.S.C. §119(a) to Korean Patent Application No. 10-2011-0141660 filed Dec. 23, 2011, both of which are incorporated herein by reference into the present disclosure as if fully set forth herein.

TECHNICAL FIELD

The present invention relates to an apparatus and method for providing a voice service in a Wireless Local Access Network (WLAN) system. More particularly, the present invention relates to an apparatus and method for providing a voice service in a form of multicast in a WLAN system.

BACKGROUND ART

A radio communication system has been evolved to provide various high-speed large-capacity services to Mobile Stations (MSs), and a typical example of the radio communication system may include a Long-Term Evolution (LTE) mobile communication system, a Long-Term Evolution Advanced (LTE-A) mobile communication system, an Evolved Packet System (EPS), and an Institute of Electrical and Electronics Engineers (IEEE) 802.16m communication system.

As the radio communication system has been evolved, MSs have been also evolved to enable receiving various high-speed large-capacity services, and specially to be a smart phone. As a smart phone market has been grown, a demand for a voice service through a WLAN module equipped in a smart phone has been greatly increased.

In an enterprise WLAN environment, the number of MSs which access a particular Access Point (AP) has been increased as a demand for a voice service through a Fixed Mobile Convergence (FEM) service has been increased. So, there is a need for one AP to simultaneously provide a plurality of MSs with a voice service.

A WLAN system uses a Carrier Sensing Multiple Access/Collision Avoidance (CSMA/CA) protocol for a medium access, and an Enhanced Distributed Channel Access (EDCA) scheme for guaranteeing Quality of Service (QoS).

The EDCA scheme uses a distributed access scheme for an access to radio resources, so an overhead for avoiding a collision and acquiring synchronization are relatively large. The overhead includes back-off delay necessary per each data packet transmission, a physical (PHY) preamble transmission, a PHY header transmission, an acknowledgement (ACK) frame transmission, etc. In a packet network system such as a WLAN system, efficiency of the EDCA scheme becomes worst for a voice service such as a Voice over Internet Protocol (VoIP) service on which traffic with a relatively small size occurs every period. A VoIP service capacity per AP becomes limited due to a sharp decline for efficiency of the EDCA scheme, so a packet network performance becomes decreased.

DISCLOSURE OF INVENTION

Technical Problem

An aspect of an embodiment of the present invention is to provide an apparatus and method for providing a voice service in a WLAN system.

Another aspect of an embodiment of the present invention is to provide an apparatus and method for providing a voice service in a form of multicast in a WLAN system.

Further another aspect of an embodiment of the present invention is to provide an apparatus and method for providing a voice service in a WLAN system thereby minimizing a data packet transmission/reception overhead.

Still another aspect of an embodiment of the present invention is to provide an apparatus and method for providing a voice service in a WLAN system thereby maximizing a voice service capability.

Still another aspect of an embodiment of the present invention is to provide an apparatus and method for providing a voice service to a plurality of Mobile Stations (MSs) in a WLAN system by multicasting a multiplexing voice data packet which is generated by multiplexing voice data packets to be transmitted to the plurality of MSs which has accessed an Access Point (AP).

Solution to Problem

In accordance with one aspect of the present invention, there is provided a method for providing a voice service by an Access Point (AP) in a Wireless Local Access Network (WLAN) system. The method includes generating a multiplexing voice data packet by performing a multiplexing operation on at least two voice data packets among received voice data packets; and performing a multicast operation of multicasting the multiplexing voice data packet to Mobile Stations (MSs) which should receive the at least two voice data packets.

In accordance with another aspect of the present invention, there is provided a method for receiving a voice service by a Mobile Station (MS) in a Wireless Local Access Network (WLAN) system. The method includes receiving a multiplexing voice data packet from an Access Point (AP), wherein the multiplexing voice data packet is generated, at the AP, by performing a multiplexing operation on at least two voice data packets among received voice data packets, and multicast by performing a multicast operation.

In accordance with further another aspect of the present invention, there is provided an Access Point (AP) in a Wireless Local Access Network (WLAN) system. The AP includes a multiplexing block for generating a multiplexing voice data packet by performing a multiplexing operation on at least two voice data packets among received voice data packets; and a transmission block for performing a multicast operation of multicasting the multiplexing voice data packet to Mobile Stations (MSs) which should receive the at least two voice data packets.

In accordance with still another aspect of the present invention, there is provided a Mobile Station (MS) in a Wireless Local Access Network (WLAN) system. The MS includes a reception block for receiving a multiplexing voice data packet from an Access Point (AP), wherein the multiplexing voice data packet is generated, at the AP, by performing a multiplexing operation on at least two voice data packets among received voice data packets, and multicast by performing a multicast operation.

Advantageous Effects of Invention

As is apparent from the foregoing description, embodiments of the present invention enable a voice service provision in a form of multicast in a WLAN system. Embodiments of the present invention enable a voice service provision in a WLAN system thereby minimizing a data packet transmission/reception overhead. Embodiments of the present invention enable a voice service provision in a WLAN system thereby maximizing a voice service capability. Embodiments of the present invention enable a voice service provision for a plurality of Mobile Stations (MSs) in a WLAN system by multicasting a multiplexing voice data packet which is generated by multiplexing voice data packets to be transmitted to the plurality of MSs which has accessed an Access Point (AP). Embodiments of the present invention enable a voice service provision for a plurality of MSs in a WLAN system by multicasting a multiplexing voice data packet which is generated by multiplexing voice data packets to be transmitted to the plurality of MSs which has accessed an AP thereby reducing an overhead necessary for transmitting a voice data packet such as backoff delay, a physical (PHY) preamble transmission, a PHY header transmission, an ACK frame transmission, etc.

Table 1 describes a simulation result for a voice service provision method in a WLAN system according to embodiments of the present invention, i.e., a voice service provision method in a form of multicast in a WLAN system in a case that a G.711 coder/decoder (CODEC) is used, a Real-time Transport Protocol (RTP) frame transmission period is 20 [ms], the maximum number of VoIP data packets to be multiplexed is 4, and environments in which a 5 [GHz], a mixed format, and a Guard Internal (GI)=0.8 [us] are used in an Institute of Electrical and Electronics Engineers (IEEE) 802.11n standard.

Table 1

TABLE 1

| PHY rate | transmission time decrease rate on applying multiplexing scheme | VoIP capacity increase rate(expectation value) |
| --- | --- | --- |
| 6.5 Mbps | 13% | 19% |
| 13.0 Mbps | 18% | 24% |
| 19.5 Mbps | 22% | 29% |
| 26.0 Mbps | 24% | 31% |
| 39.0 Mbps | 28% | 40% |
| 52.0 Mbps | 29% | 41% |
| 58.5 Mbps | 29% | 42% |
| 65.0 Mbps | 29% | 42% |

As described in Table 1, if a multiplexing scheme is applied to a multiplexing VoIP data packet proposed in an embodiment of the present invention according to a PHY rate, transmission time becomes decreased as compared with a case in which the multiplexing scheme is not applied, so an expectation VoIP service capacity according to the transmission time decrease becomes increased. For example, if a PHY rate is 6.5 [Mbps] and the multiplexing scheme is applied, a transmission time is decreased by 13[%] and a VoIP service capacity is increased by 19[%] as compared with a case in which the multiplexing scheme is not applied.

If a data packet multiplexing scheme proposed in an embodiment of the present invention is applied and the maximum number of VoIP data packets which are multiplexed is 4, a VoIP service capacity becomes increased by 19[%]-42[%] as compared with a case in which the packet multiplexing scheme is not applied. So, the maximum number of VoIP data packets which are multiplexed becomes more increased, and a VoIP service capacity becomes more increased.

BRIEF DESCRIPTION OF DRAWINGS

The above and other objects, features and advantages of certain embodiments of the present invention will be more apparent from the following detailed description taken in conjunction with the accompanying drawings, in which.

MODE FOR THE INVENTION

Figure 1:
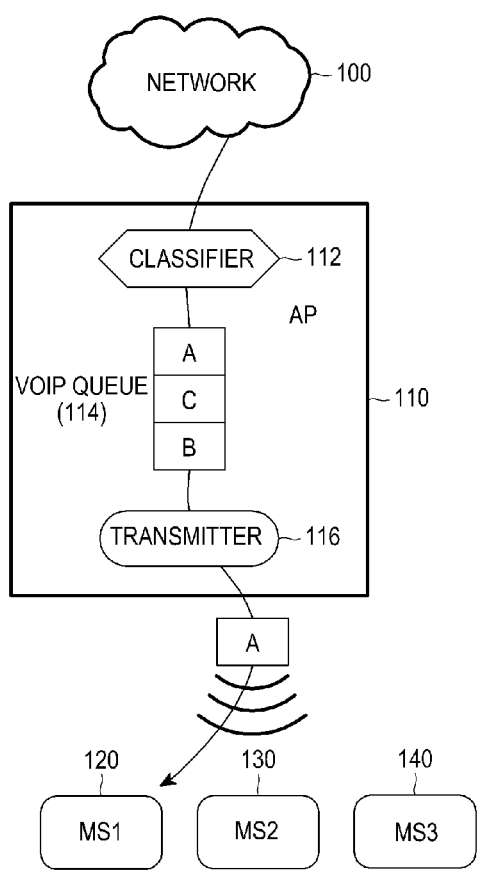
FIG. 1 schematically illustrates a method of providing a VoIP service in a conventional WLAN system.

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

An embodiment of the present invention proposes an apparatus and method for providing a voice service in a Wireless Local Access Network (WLAN) system.

Another embodiment of the present invention proposes an apparatus and method for providing a voice service in a form of multicast in a WLAN system.

Further another embodiment of the present invention proposes an apparatus and method for providing a voice service in a WLAN system thereby minimizing a data packet transmission/reception overhead.

Still another embodiment of the present invention proposes an apparatus and method for providing a voice service in a WLAN system thereby maximizing a voice service capability.

Still another embodiment of the present invention proposes apparatus and method for providing a voice service to a plurality of Mobile Stations (MSs) in a WLAN system by multicasting a multiplexing voice data packet which is generated by multiplexing voice data packets to be transmitted to the plurality of MSs which has accessed an Access Point (AP).

In accordance with one aspect of the present invention, there is provided an Access Point (AP) in a WLAN system. The AP includes a multiplexing block for generating a multiplexing voice data packet by performing a multiplexing operation on at least two voice data packets among received voice data packets; and a transmission block for performing a multicast operation of multicasting the multiplexing voice data packet to Mobile Stations (MSs) which should receive the at least two voice data packets.

Herein, the multiplexing block generates the multiplexing voice data packet by performing the multiplexing operation if a number of voice service calls which are provided by the AP is greater than or equal to a threshold voice service call number.

Herein, the voice data packets which are generated as the multiplexing voice data packet are voice data packets targeting MSs mapping to Identifiers (IDs) of the MSs included in a multiplexing list, and the IDs of the MSs included in the multiplexing list are IDs of MSs to which a data packet multiplexing operation is applied.

Herein, the transmission block multicasts the multiplexing voice data packet and transmits voice data packets except for the voice data packets which are generated as the multiplexing voice data packet among the received voice data packets to related MSs.

Herein, the AP further comprises a multiplexing management block for detecting whether an arbitrary MS joins a multiplexing voice data packet generation upon receiving a voice service request from the arbitrary MS; and a multiplexing list block for including an Identifier (ID) of the arbitrary MS in a multiplexing list including IDs of MSs to which a data packet multiplexing operation is applied if the arbitrary MS joins the multiplexing voice data packet generation.

Herein, the transmission block notifies the arbitrary MS that the ID of the arbitrary MS will be deleted from the multiplexing list upon detecting that the voice service for the arbitrary MS is terminated.

Herein, the multiplexing voice data packet includes an Internet Protocol (IP) field, a User Datagram Protocol (UDP) field, a sequence field, a multiplexing field, and a Real Time Protocol (RTP) field and a voice data field corresponding to each of the at least two voice data packets, the IP field and the UDP field includes information on a multicast address and information on a port the sequence field includes a RTP sequence number of a voice data packet which is lastly transmitted to MSs included in a multiplexing list, the multiplexing field is used for distinguishing RTP fields and voice data fields behind the multiplexing field, the RTP field includes a RTP header included in a related voice data packet, and the voice data field includes a voice data included in the related voice data packet.

Herein, the multicasting operation has a priority higher than priorities applied to other transmission operations.

Herein, the transmission block multicasts the multiplexing voice data packet to the MSs which should receive the at least two voice data packets using an Arbitration Inter-frame Space Number (AIFSN) set to an Access Category_Voice (AC_VO) indicating that an access category is a voice service, a Contention Window Minimum (CWmin) value, and a Contention Window Maximum (CWmax) value, and the CWmin value and the CWmax value are set to '0' and used upon performing a backoff operation.

In accordance with another aspect of the present invention, there is provided a Mobile Station (MS) in a WLAN system. The MS includes a reception block for receiving a multiplexing voice data packet from an Access Point (AP), wherein the multiplexing voice data packet is generated, at the AP, by performing a multiplexing operation on at least two voice data packets among received voice data packets, and multicast by performing a multicast operation.

Herein, the multiplexing voice data packet is generated, at the AP, by performing the multiplexing operation if a number of voice service calls which are provided by the AP is greater than or equal to a threshold voice service call number.

Herein, the voice data packets which are generated as the multiplexing voice data packet are voice data packets targeting MSs mapping to Identifiers (IDs) of the MSs included in a multiplexing list, and the IDs of the MSs included in the multiplexing list are IDs of MSs to which a data packet multiplexing operation is applied.

Herein, voice data packets except for the voice data packets which are generated as the multiplexing voice data packet among the received voice data packets are transmitted to related MSs.

Herein, the MS further comprises a transmission block for transmitting a voice service request to the AP, and transmitting the determined result to the AP after transmitting the voice service request thereby the AP detects whether the MS joins the multiplexing voice data packet generation, and includes an Identifier (ID) of the MS in a multiplexing list including IDs of MSs to which a data packet multiplexing operation is applied according to the detected result.

Herein, the transmission block notifies the AP that the voice service is terminated upon detecting that the voice service is terminated thereby the AP deletes the ID of the MS from the multiplexing list.

Herein, the multiplexing voice data packet includes an Internet Protocol (IP) field, a User Datagram Protocol (UDP) field, a sequence field, a multiplexing field, and a Real Time Protocol (RTP) field and a voice data field corresponding to each of the at least two voice data packets, and the IP field includes an IP header of the multiplexing voice data packet, the UDP field includes a UDP header of the multiplexing voice data packet, the sequence field includes a RTP sequence number of a lastly transmitted voice data packet, the multiplexing field is used for distinguishing RTP fields and voice data fields behind the multiplexing field, and fields prior to the multiplexing field, the RTP field includes a RTP header included in a related voice data packet, and the voice data field includes a voice data included in the related voice data packet.

Herein, the multicasting operation has a priority higher than priorities applied to other transmission operations.

Herein, the multicast operation includes an operation of multicasting the multiplexing voice data packet to the MSs which should receive the at least two voice data packets using a Point Inter-frame Space (PIFS) set to an Access Category_Voice (AC_VO) indicating that an access category is a voice service, a Contention Window Minimum (CWmin) value, and a Contention Window Maximum (CWmax) value, and the CWmin value and the CWmax value are set to '0' and used upon performing a backoff operation.

Embodiments of the present invention will be described below with reference to the WLAN system. However, it will be understood by those of ordinary skill in the art that embodiments of the present invention may be applied to any one of a Long-Term Evolution (LTE) mobile communication system, a Long-Term Evolution Advanced (LTE-A) mobile communication system, an Evolved Packet System (EPS), and an Institute of Electrical and Electronics Engineers (IEEE) 802.16m communication system as well as the WLAN system.

For convenience, it will be assumed that the voice service is a Voice over Internet Protocol (VoIP) service. However, it will be understood by those of ordinary skill in the art that embodiments of the present invention may be applied to other voice services as well as the VoIP service.

For convenience, it will be assumed that a VoIP service is provided using an Enhanced Distributed Channel Access (EDCA) scheme. However, it will be understood by those of ordinary skill in the art that embodiments of the present invention may be applied to other schemes as well as the EDCA scheme. FIG. 1 schematically illustrates a method of providing a VoIP service in a conventional WLAN system.

Referring to FIG. 1, a conventional WLAN system includes a network 100, an AP 110, and a plurality of MSs, for example, 3 MSs, i.e., an MS1 to an MS3 120,130,140.

The AP 110 connected to the network 100 includes a classifier 112, a VoIP queue 114, and a transmitter 116. The MS1 to the MS3 120,130,140 may access the AP 110, and receive a VoIP service from the AP 110. For example, each of the MS1 to the MS3 120,130,140 may be a smart phone. However, it will be understood by those of ordinary skill in the art that each of the MS1 to the MS3 120,130,140 may be any one of all terminals which may receive the VoIP service as well as the smart phone.

That is, the AP 110 which receives a plurality of data packets through the network 100 detects VoIP data packets from among the plurality of data packets through the classifier 112, and stores the detected VoIP data packets, for example, VoIP data packets A,B,C in the VoIP queue 114. The AP 110 transmits a VoIP data packet stored in the VoIP queue 114, e.g., a VoIP data packet A to a related MS among the MS1 to the MS3 120,130,140, e.g., the MS1 120 through the transmitter 116.

In FIG. 1, the AP 110 transmits a VoIP data packet to one MS at a specific timing point. In this case, a VoIP service capacity of the AP 110 may be limited.

In the present invention, one AP may transmit a VoIP data packet to a plurality of MSs thereby increasing a VoIP service capacity of the AP, and the detailed description will be followed.

Figure 2:
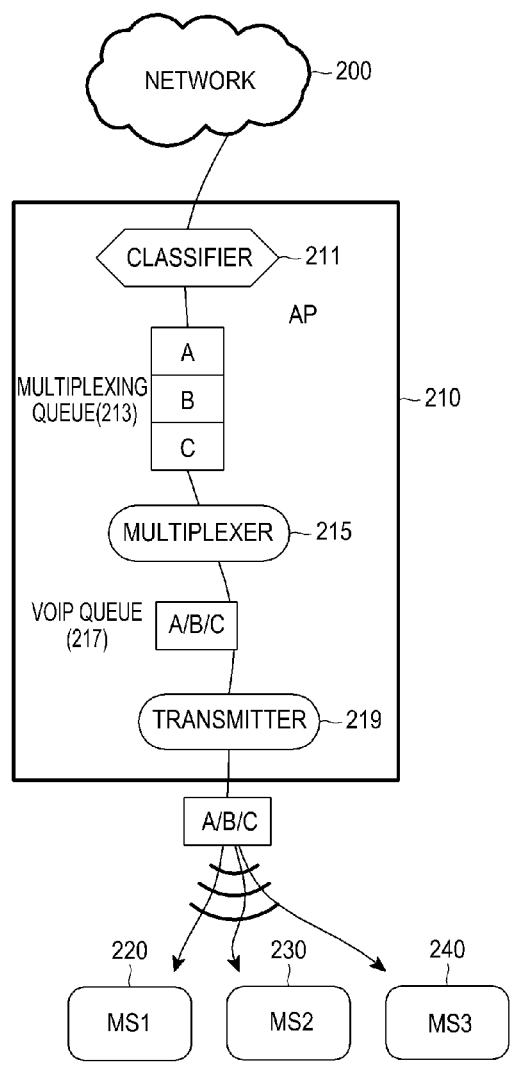
FIG. 2 schematically illustrates a method of providing a VoIP service in a WLAN system according to an embodiment of the present invention.

FIG. 2 schematically illustrates a method of providing a VoIP service in a WLAN system according to an embodiment of the present invention.

Referring to FIG. 2, a WLAN system includes a network 200, an AP 210, and an MS1 to an MS3 220,230,240.

The AP 210 connected to the network 200 includes a classifier 211, a multiplexing queue 213, a multiplexer 215, a VoIP queue 217, and a transmitter 219. The MS1 to the MS3 220,230,240 may access the AP 210, and receive a VoIP service from the AP 210.

That is, the AP 210 which receives a plurality of data packets through the network 200 detects VoIP data packets among the plurality of data packets through the classifier 211, and stores the detected VoIP data packets, for example, VoIP data packets A,B,C in the multiplexing queue 213. The AP 210 generates one data packet, e.g., a VoIP data packet A/B/C by multiplexing the VoIP data packets A,B,C stored in the multiplexing queue 213 through the multiplexer 215, and stores the generated VoIP data packet A/B/C in the VoIP queue 217. For convenience, a VoIP data packet which the multiplexer 215 generates by multiplexing at least two VoIP data packets is called as a 'multiplexing VoIP data packet'.

The AP 210 multicasts the VoIP data packet A/B/C stored in the VoIP queue 217 to the MS1 to the MS3 220,230,240 through the transmitter 219. Each of the MS1 to the MS3 220,230,240 receiving the VoIP data packet A/B/C detects a VoIP data packet targeting each of the MS1 to the MS3 220,230,240 by analyzing the VoIP data packet A/B/C.

As described above, the AP 210 in FIG. 2 may transmit a VoIP data packet to a plurality of MSs at a specific timing point using a multicast scheme, so transmission efficiency becomes increased. Total radio resource amount necessary for transmitting multiplexing VoIP data packets becomes decreased as the transmission efficiency becomes increased, so the AP 210 may provide a VoIP service with a relatively more capability compared with a VoIP data packet transmission in a conventional WLAN system as described in FIG. 1.

Meanwhile, a multicast multiplexing VoIP data packet, i.e., a VoIP data packet A/B/C may be lost due to a radio error as well as a VoIP data packet transmitted using the multicast scheme is not retransmitted in a Medium Access Control (MAC) layer. So, each of the MS1 to the MS3 220,230,240 should determine whether a VoIP data packet targeting each of the MS1 to the MS 3 220,230,240 has been lost whenever each of the MS1 to the MS3 220,230,240 receives a multiplexing VoIP data packet. If there is a lost VoIP data packet, a related MS transmits a request for retransmission of the lost VoIP data packet to the AP 210. After receiving the request from the related MS, the AP 210 retransmits the lost VoIP data packet.

Figure 3:
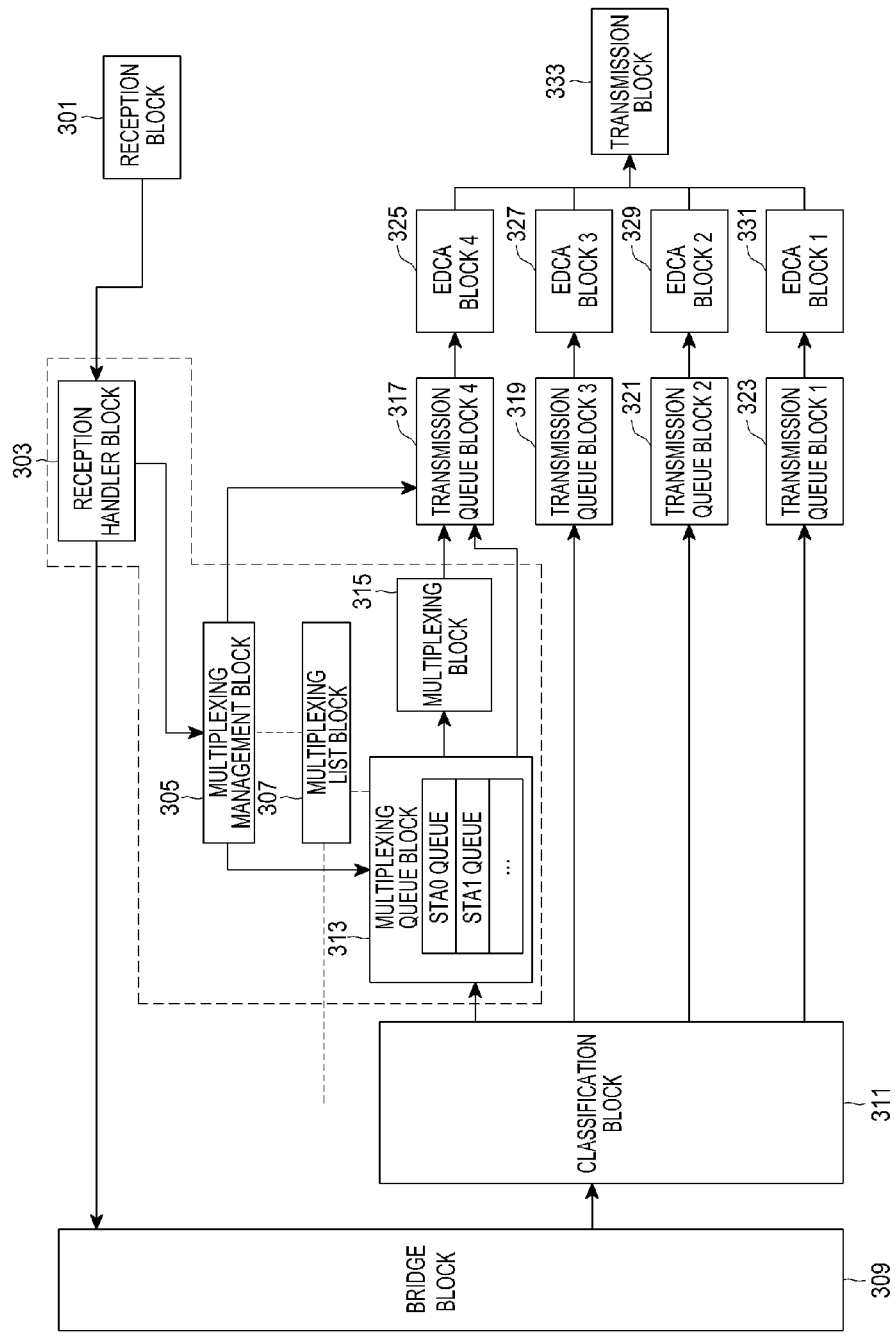
FIG. 3 schematically illustrates an internal structure of an AP in a WLAN system according to an embodiment of the present invention.

FIG. 3 schematically illustrates an internal structure of an AP in a WLAN system according to an embodiment of the present invention.

Referring to FIG. 3, an AP includes a reception block 301, a reception handler block 303, a multiplexing management block 305, a multiplexing list block 307, a bridge block 309, a classification block 311, a multiplexing queue block 313, a multiplexing block 315, a transmission queue block 1 323, a transmission queue block 2 321, a transmission queue block 3 319, a transmission queue block 4 317, an EDCA block 1 331, an EDCA block 2 329, an EDCA block 3 327, an EDCA block 4 325, and a transmission block 333. Hereinafter, it will be assumed that an MS which has accessed the AP is a smart phone.

The AP transfers a plurality of data packets received through the reception block 301 to the reception handler block 303. The reception handler block 303 classifies the data packets transferred from the reception block 301 into data packets which the reception handler block 303 should process and data packets except for the data packets which the reception handler block 303 should process, and transfers the classified data packets to the multiplexing management block 305 and the bridge block 309. The bridge block 309 connects a Wide Area Network (WAN) with a WLAN. The data packets which the reception handler block 303 should process are data packets for which retransmission is requested by MSs on performing a data packet multiplexing operation. A detailed description of the retransmission operation will be followed with reference FIG. 6.

The classification block 311 classifies the data packets transferred from the bridge block 309 into data packets by a service type or an MS, and transfers a VoIP data packet among the classified data packets to the multiplexing queue block 313. The multiplexing queue block 313 temporarily stores a VoIP data packet classified by the MS in order to generate a multiplexing VoIP data packet, and includes queues allocated according to each MS, i.e., an MS1 queue, an MS2 queue, etc.

The AP determines whether an Identifier (ID) of an MS to which a VoIP data packet is transmitted through the multiplexing list block 307 is included in a preset multiplexing list. If the ID of the MS is included in the multiplexing list, the AP stores the VoIP data packet in a related queue among queues included in the multiplexing queue block 313.

If the ID of the MS is not included in the multiplexing list, the AP transmits the VoIP data packet through the transmission queue block 4 317, the EDCA block 4 325 and the transmission block 333. The multiplexing list includes IDs of MSs to which a data packet multiplexing operation is applied, and the multiplexing management block 305, the classification block 311, the multiplexing queue block 313, and the multiplexing block 315 may use the multiplexing list.

In a case that the AP immediately transmits the VoIP data packet to the MS for a variety of reasons such as a handover occurrence even though the ID of the MS is included in the multiplexing list, the AP may immediately transmit the VoIP data packet to the MS by transferring the VoIP data packet to the transmission queue block 4 317 instead of storing the VoIP data packet in the multiplexing queue block 313.

In an embodiment of the present invention, it will be assumed that the AP does not perform a data packet multiplexing operation on VoIP data packets if the number of ongoing VoIP calls is less than a threshold VoIP call number. In this case, the AP immediately transmits the VoIP data packets to related MSs without performing the data packet multiplexing operation on the VoIP data packets.

The AP may adaptively determine the threshold VoIP call number based on a situation of the communication system, and a detailed description of determining the threshold VoIP call number will be omitted. However, it will be understood by those of ordinary skill in the art that the AP may perform the data packet multiplexing operation on the VoIP data packets without considering the number of ongoing VoIP calls. In an embodiment of the present invention, the AP performs the data packet multiplexing operation on the VoIP data packets based on the number of ongoing VoIP calls for a total throughput increase in the WLAN system. For reference, the transmission queue 1 to the transmission queue 4 323,321,319,317 are classified based on various parameters such as a service type of related data packet.

The AP performs a data packet multiplexing process, i.e., a multiplexing VoIP data packet generation process by multiplexing VoIP data packets stored in the multiplexing queue block 313 through the multiplexing block 315. The multiplexing block 315 may multiplex maximum M of VoIP data packets, and generally multiplexes m (m≤M) VoIP data packets selected from among M VoIP data packets based on a priority of each of related VoIP data packets. The priority will be determined based on various parameters. For example, a relatively high priority may be allocated to a VoIP data packet to be retransmitted, and a VoIP data packet which has been stored for a relatively long time in the multiplexing queue. A detailed description of determining a priority will be omitted.

The AP transfers the multiplexing VoIP data packet to the transmission queue block 4 317 thereby the transmission queue block 4 317 stores the multiplexing VoIP data packet, and multicasts the multiplexing VoIP data packet stored in the transmission queue block 4 317 to related MSs through the EDCA block 4 325 and the transmission block 333.

The AP may previously know status of all MSs to which the AP will multicast the multiplexing VoIP data packet. For example, if an MS on a power save state is one of all the MSs to which the AP will multicast the multiplexing VoIP data packet, the AP should transmit the multiplexing VoIP data packet by indicating whether a multicast transmission is performed using a Indication MAP (TIM) included in a beacon message.

The reason why the AP transmits the multiplexing VoIP data packet by indicating whether the multicast transmission is performed using the TIM is that the MS on the power save state facilitates transition to a normal state and reception of the multiplexing VoIP data packet. So, the MS on the power save state may transit from the power save state to the normal state, and receive the multiplexing VoIP data packet which the AP multicasts on the normal state.

However, it will be understood by those of ordinary skill in the art that the AP may omit the operation of transmitting the multiplexing VoIP data packet by indicating whether the multicast transmission is performed using the TIM if the MS on the power save state is not one of all the MSs to which the AP will multicast the multiplexing VoIP data packet. In an embodiment of the present invention, the AP indicates whether the multicast transmission is performed using the TIM included in the beacon message. However, it will be understood by those of ordinary skill in the art that the AP may indicate whether the multicast transmission is performed using other messages different from the beacon message, or other parameters, different from the TIM, included in the beacon message.

The AP may allocate a priority higher than a priority allocated to other transmission to the multicast transmission upon multicasting the multiplexing VoIP data packet. In the EDCA scheme, the AP performs a backoff operation based on an Arbitration Inter-frame Space Number (AIFSN) set to an Access Categry_Voice (AC_VO) indicating that an access category is a voice service, a Contention Window Minimum (CWmin) value, and a Contention Window Maximum (CWmax) value upon transmitting a VoIP data packet.

However, the AP performs a backoff operation by setting the CWmin value and the CWmax value to '0' upon multicasting the multiplexing VoIP data packet. So, the multiplexing VoIP data packet which the AP transmits is not collided with a transmission of an MS.

Meanwhile, the multiplexing list managed in the multiplexing list block 307 is managed regardless of the data packet multiplexing operation, and a detailed description of managing the multiplexing list will be followed below.

The AP transmits a multiplexing join request message indicating that the AP requests to join a multiplexing VoIP data packet generation to a related MS to the related MS through the transmission block 333 if the multiplexing management block 305 detects that a VoIP call has occurred in an MS, or an MS which currently performs a VoIP call hands over from other AP to the AP. The AP receives a multiplexing join response message in response to the multiplexing join request message through the reception block 301 from the MS. The multiplexing join response message includes a multiplexing VoIP data packet generation join indicator indicating whether the MS joins the multiplexing VoIP data packet generation process. In an embodiment of the present invention, the MS indicates whether the MS joins the multiplexing VoIP data packet generation process by including the multiplexing VoIP data packet generation join indicator in the multiplexing join response message. However, it will be understood by those of ordinary skill in the art that the MS may transmit the multiplexing join response message only if the MS joins the multiplexing VoIP data packet generation process thereby the AP may detect whether the MS joins the multiplexing VoIP data packet generation process. The MS starts to receive a multiplexing VoIP data packet multicast from the AP as soon as the MS transmits a multiplexing join response message indicating that the MS will join the multiplexing VoIP data packet generation process or the MS transmits the multiplexing join response message.

The AP detects a MAC address of the MS through the multiplexing management block 305, and adds the MAC address of the MS to the multiplexing list. That is, the AP stores the MAC address of the MS, i.e., an ID of the MS in the multiplexing list, and stores multiplexing status for the MS. Further, the multiplexing join request message includes various parameters related to generation and transmission of the multiplexing VoIP data packet such as a multicast address, a multiplexing period, a multiplexing ID of the MS, etc. The AP transmits a multiplexing list delete notification message indicating that the ID of the MS will be deleted from the multiplexing list in the multiplexing management block 305 through the transmission block 333 if the multiplexing management block 305 detects that a VoIP call has been terminated in an MS, or an MS which currently performs a VoIP call hands over from the AP to other AP. The AP receives a multiplexing list delete confirm message in response to the multiplexing list delete notification message through the reception block 301 from the MS.

The AP deletes the ID of the MS from the multiplexing list through the multiplexing management block 305, and transmits a multiplexing list delete complete message indicating that the ID of the MS has been deleted from the multiplexing list to the MS through the transmission block 333. Here, the MS stops receiving a multiplexing VoIP data packet multicast from the AP upon receiving the multiplexing list delete complete message.

In an embodiment of the present invention, only if the AP transmits the multiplexing list delete notification message, and receives the multiplexing list delete confirm message in response to the multiplexing list delete notification message from a related MS, the AP deletes the ID of the related MS from the multiplexing list. However, it will be understood by those of ordinary skill in the art that the AP may delete the ID of the related MS from the multiplexing list as soon as the AP transmits the multiplexing list delete notification message. In this case, it is unnecessary that the AP transmits the multiplexing list delete complete message to the related MS.

The AP manages multiplexing status of each MS based on a multiplexing status parameter stored for each MS ID included in the multiplexing list. If the number of ongoing VoIP calls is relatively small, that is, the number of ongoing VoIP calls is less than a threshold VoIP call number, the AP sets values of multiplexing status parameters of all MSs mapping to MS IDs included in the multiplexing list to a preset value, e.g., '0'. The value of the multiplexing status parameter '0' indicates that the AP does not perform a data packet multiplexing operation, i.e., the AP does not generate a multiplexing VoIP data packet.

If the number of ongoing VoIP calls is greater than or equal to the threshold VoIP call number, the AP sets values of multiplexing status parameters of some or all MSs to which the AP provides the VoIP service to a preset value, e.g., '1'. The value of the multiplexing status parameter '1' indicates that the AP performs the data packet multiplexing operation, i.e., the AP generates the multiplexing VoIP data packet.

As described above, the AP may determine whether the AP performs a data packet multiplexing operation according to a situation at a related timing point, and select MSs to which the data packet multiplexing operation is operated.

While the reception block 301, the reception handler block 303, the multiplexing management block 305, the multiplexing list block 307, the bridge block 309, the classification block 311, the multiplexing queue block 313, the multiplexing block 315, the transmission queue block 1 323, the transmission queue block 2 321, the transmission queue block 3 319, the transmission queue block 4 317, the EDCA block 1 331, the EDCA block 2 329, the EDCA block 3 327, the EDCA block 4 325, and the transmission block 333 are shown in FIG. 3 as separate units, it is to be understood that this is for merely convenience of description. In other words, the reception block 301, the reception handler block 303, the multiplexing management block 305, the multiplexing list block 307, the bridge block 309, the classification block 311, the multiplexing queue block 313, the multiplexing block 315, the transmission queue block 1 323, the transmission queue block 2 321, the transmission queue block 3 319, the transmission queue block 4 317, the EDCA block 1 331, the EDCA block 2 329, the EDCA block 3 327, the EDCA block 4 325, and the transmission block 333 may be incorporated into a single unit.

Figure 4:
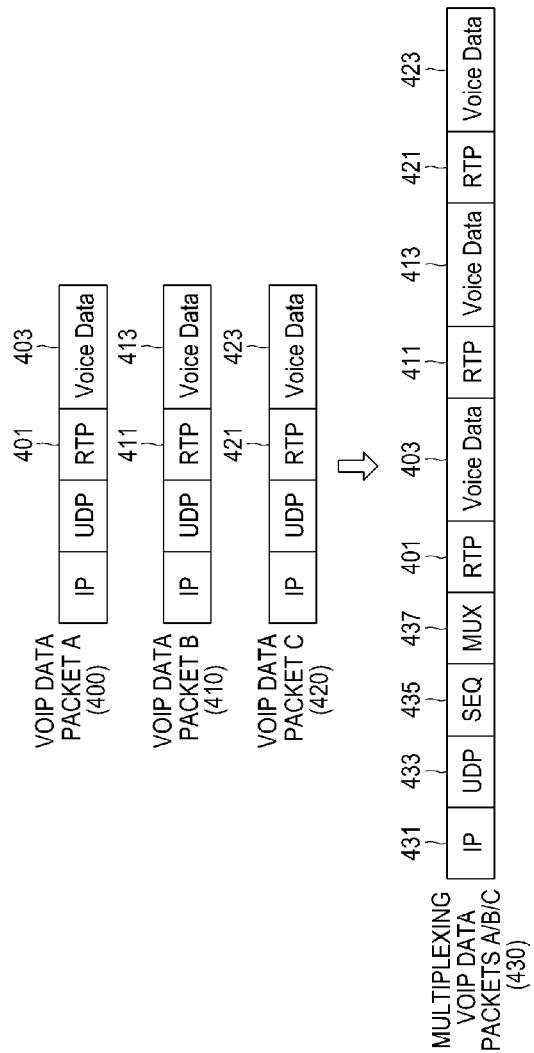
FIG. 4 schematically illustrates a format of a multiplexing VoIP data packet which is generated on a packet multiplexing process in a WLAN system according to an embodiment of the present invention.

FIG. 4 schematically illustrates a format of a multiplexing VoIP data packet which is generated on a data packet multiplexing process in a WLAN system according to an embodiment of the present invention.

Referring to FIG. 4, if 3 VoIP data packets, for example, a VoIP data packet A 400, a VoIP data packet B 410, a VoIP data packet C 420 have occurred, each of the VoIP data packets includes an Internet Protocol (IP) field, a User Datagram Protocol (UDP) field, a Real Time Protocol (RTP) field, and a voice data field. That is, the VoIP data packet A 400 includes an IP field 401, a UDP field 403, a RTP field 405 and a voice data field 407, the VoIP data packet B 410 includes an IP field 411, a UDP field 413, a RTP field 415 and a voice data field 417, and the VoIP data packet C 420 includes an IP field 421, a UDP field 423, a RTP field 425 and a voice data field 427.

Each of the IP fields 401,411,421 includes an IP header of a related VoIP data packet, each of the UDP fields 403,413, 423 includes an UDP header of a related VoIP data packet, each of the RTP fields 405,415,425 includes an RTP header of a related VoIP data packet, and each of the voice data fields 407,417,427 includes a voice data of a related VoIP data packet.

As described above, the VoIP data packets A,B,C 400, 410,420 are generated as a multiplexing VoIP data packet A/B/C 430 through the data packet multiplexing operation at the AP. The multiplexing VoIP data packet A/B/C 430 includes an IP field 431, a UDP field 433, a sequence (SEQ) field 435, a multiplexing (MUX) field 437, a RTP field 401 and a voice data field 403 included in the VoIP data packet A 400, a RTP field 411 and a voice data field 413 included in the VoIP data packet B 410, and a RTP field 421 and a voice data field 423 included in the VoIP data packet C 420.

The SEQ field 435 includes a RTP sequence number of a VoIP data packet which the AP has lastly transmitted to MSs included in the multiplexing list, the MUX field 437 is used for distinguishing RTP fields 405,415,425 and voice data fields 407,417,427 behind the MUX field 437.

Upon performing the data packet multiplexing operation, the AP generates the multiplexing VoIP data packet A/B/C 430 by concatenating the RTP field and the voice data field included in each VoIP data packet and including the IP field and the UDP field, and multicasts the multiplexing VoIP data packet A/B/C 430 to MSs which should receive each VoIP data packet. So, the AP may simultaneously transmit the multiplexing VoIP data packet A/B/C 430 to a plurality of MSs.

Figure 5A:
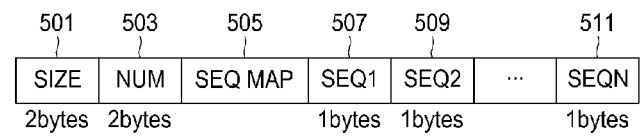
FIG. 5a schematically illustrates a format of an SEQ field included in a multiplexing VoIP data packet in a WLAN system according to an embodiment of the present invention.

FIG. 5a schematically illustrates a format of an SEQ field included in a multiplexing VoIP data packet in a WLAN system according to an embodiment of the present invention.

Referring to FIG. 5a, an SEQ field includes a size field 501, a Number (NUM) field 503, an SEQ MAP field 505, and an SEQ field 1 to an SEQ field N 507-511. Each of the SEQ field 1 to an SEQ field N 507-511 denotes a RTP sequence number, and should include all information necessary for MSs mapping to MS IDs included in a multiplexing list managed in a multiplexing management block 305 thereby the MSs may detect RTP sequence numbers of VoIP data packets which the MSs should receive.

The size field 501 indicates a size of the SEQ MAP field 505, and each of the SEQ field 1 to the SEQ field N 507-511 indicates least significant bit (LSB) 8 bits of a RTP sequence number included in a VoIP data packet. The SEQ MAP field 505 is used for indicating a RTP sequence number of which MS is included in each of the SEQ field 1 to the SEQ field N 507-511.

Figure 5B:
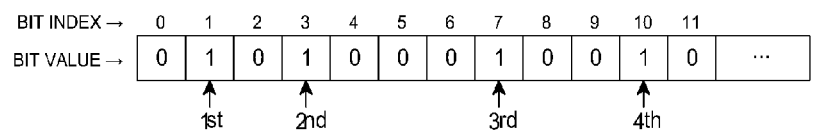
FIG. 5b schematically illustrates a format of an SEQ MAP field included in a SEQ field included in a multiplexing VoIP data packet in a WLAN system according to an embodiment of the present invention.

FIG. 5b schematically illustrates a format of an SEQ MAP field included in an SEQ field included in a multiplexing VoIP data packet in a WLAN system according to an embodiment of the present invention.

Referring to FIG. 5b, an SEQ MAP field indicates bitmap information. If a bit index of the Kth 1 in a bitmap is L, an SEQK denotes a RTP sequence number of an MS with a multiplexing ID L. That is, SEQ1, SEQ2, SEQ3, SEQ4 denote RTP sequence numbers of MSs with multiplexing IDs 1,3,7,10, respectively, and the RTP sequence numbers of VoIP data packets which an AP has lastly transmitted to the MSs regardless of whether a data packet multiplexing scheme is applied.

Figure 5C:
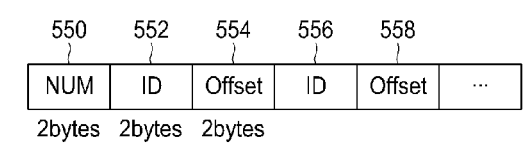
FIG. 5c schematically illustrates a format of a MUX field included in a multiplexing VoIP data packet in a WLAN system according to an embodiment of the present invention.

FIG. 5c schematically illustrates a format of a MUX field included in a multiplexing VoIP data packet in a WLAN system according to an embodiment of the present invention.

Referring to FIG. 5c, an MUX field includes a NUM field 550, an ID field 552, an offset field 554, an ID field 556, and an offset field 558.

The NUM field 550 indicates the number of RTP fields and voice data fields included in a multiplexing VoIP data packet, and the number of ID fields and offset fields included in the MUX field. The ID fields 552,556 indicate a multiplexing ID, and the offset fields 554,558 indicate an offset from next to the MUX field 437 included in a multiplexing VoIP data packet as described in FIG. 4 to a RTP field of an MS indicated by the ID fields 552, 556.

For example, if a field value of the NUM field 550 is 2, a field value of the ID field 552 is 10, a field value of the offset field 554 is 0, a field value of the ID field 556 is 11, and a field value of the offset field 558 is 172, an MS with a multiplexing ID 10 recognizes 172 bytes from next to a MUX field included in multiplexing VoIP data packet as a VoIP data packet which the MS should receive, i.e., a RTP field and a voice data field upon receiving the multiplexing VoIP data packet.

For example, if the number of MSs which simultaneously receive a VoIP service, a field value of the size field 501 included in a SEQ field included in the multiplexing VoIP data packet is 5(=40/8), and a field value of the NUM field 503 is 40. That is, 5 byte-bitmap information is included in the SEQ MAP field 505, and the SEQ field includes an SEQ field 1 to an SEQ field 40 mapping to each of 40 sequence numbers.

The AP should transmit more than 40/M multiplexing VoIP data packets per a VoIP data packet generation period in order to provide 40 MSs with a VoIP communication service. The M denotes a maximum packet number of VoIP data packets capable to be multiplexed.

Figure 6:
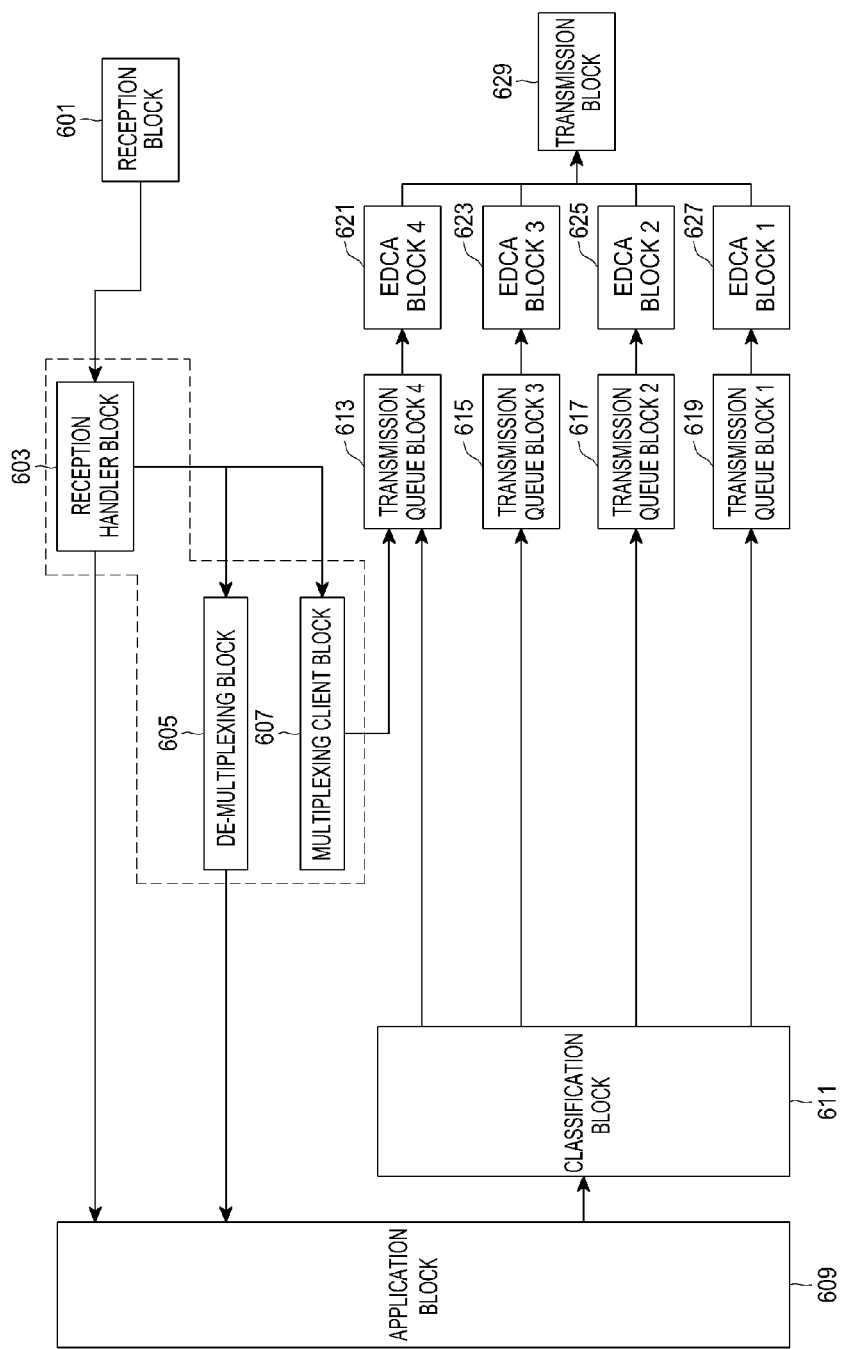
FIG. 6 schematically illustrates an internal structure of an MS in a WLAN system according to an embodiment of the present invention.

FIG. 6 schematically illustrates an internal structure of an MS in a WLAN system according to an embodiment of the present invention.

Referring to FIG. 6, an MS includes a reception block 601, a reception handler block 603, a de-multiplexing block 605, a multiplexing client block 607, an application block 609, a classification block 611, a transmission queue block 1 to a transmission queue block 4 619,617,615,613, an EDCA block 1 to an EDCA block 4 627,625,623,621, and a transmission block 629. Hereinafter, it will be assumed that an MS is a smart phone.

The MS transfers a plurality of data packets received through the reception block 601 to the reception handler block 603. The reception handler block 603 classifies the data packets transferred from the reception block 601 into multiplexing VoIP data packets and VoIP data packets, transfers the multiplexing VoIP data packets to the de-multiplexing block 605 and the multiplexing client block 607, and transfers the VoIP data packets to the application block 609. The application block 609 denotes an application which uses a WLAN such as a Fixed Mobile Convergence (FMC) service.

The MS extracts a VoIP data packet which should be transferred to the MS from the multiplexing VoIP data packet transferred to the de-multiplexing block 605, and transfers the extracted VoIP data packet to the application block 609. That is, the MS determines whether a multiplexing ID of the MS is included in a MUX field included in the multiplexing VoIP data packet through the de-multiplexing block 605. If the multiplexing ID of the MS is included in the MUX field, the MS detects a related offset field and receives a VoIP data packet, i.e., a RTP header and voice data according to a value indicated by the offset field.

The MS determines whether a RTP sequence number of a VoIP data packet which the AP has transmitted to the MS, i.e., the first value is equal to a RTP sequence number of a VoIP data packet which the MS has lastly received, i.e., the second value by detecting an SEQ field included in the MUX field through the multiplexing client block 607. If the first value is equal to the second value, the MS does not perform any operation related to retransmission. If the first value is not equal to the second value, the multiplexing client block 607 regards that a VoIP data packet which the MS should receive has been lost, and transmits, to the AP, a multiplexing negative acknowledgement message including L RTP sequence numbers, from a lastly received RTP sequence number, from among RTP sequence numbers of the VoIP data packet which the MS has received.

The multiplexing negative acknowledgement message indicates that the MS has not successfully received the VoIP data packet. After receiving the multiplexing negative acknowledgement message from the MS, the AP analyzes the multiplexing negative acknowledgement message and retransmits the VoIP data packet which the MS has not successfully received.

While the reception block 601, the reception handler block 603, the de-multiplexing block 605, the multiplexing client block 607, the application block 609, the classification block 611, the transmission queue block 1 to the transmission queue block 4 619,617,615,613, the EDCA block 1 to the EDCA block 4 627,625,623,621, and the transmission block 629 are shown in FIG. 6 as separate units, it is to be understood that this is for merely convenience of description. In other words, the reception block 601, the reception handler block 603, the de-multiplexing block 605, the multiplexing client block 607, the application block 609, the classification block 611, the transmission queue block 1 to the transmission queue block 4 619,617,615,613, the EDCA block 1 to the fourth EDCA block 4 627,625,623,621, and the transmission block 629 may be incorporated into a single unit.

Figure 7:
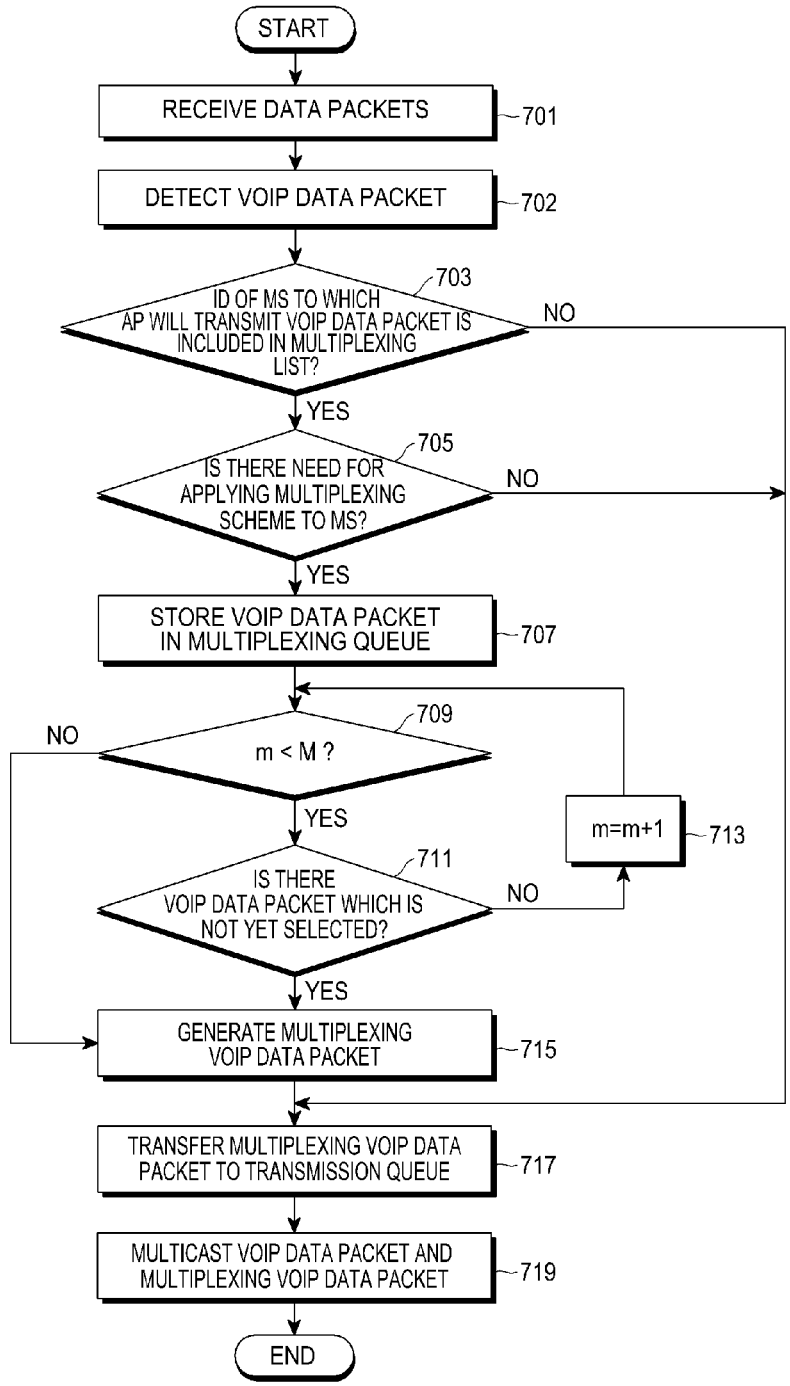
FIG. 7 is a flowchart illustrating a method for providing a VoIP service in an AP in a WLAN system according to an embodiment of the present invention.

FIG. 7 is a flowchart illustrating a method for providing a VoIP service in an AP in a WLAN system according to an embodiment of the present invention.

Referring to FIG. 7, an AP receives a plurality of data packets through a network in step 701. The AP detects a VoIP data packet from among the plurality of data packets in step 702.

The AP determines whether an ID of an MS to which the AP will transmit the VoIP data packet is included in a multiplexing list, managed by the AP, including IDs of MSs to which a data packet multiplexing scheme is applied in step 703. If the ID of the MS to which the AP will transmit the VoIP data packet is not included in the multiplexing list, the AP transfers the VoIP data packet to a transmission queue thereby the transmission queue stores the VoIP data packet in step 717.

If the ID of the MS to which the AP will transmit the VoIP data packet is included in the multiplexing list, the AP determines whether there is a need for applying a multiplexing scheme to the MS in step 705. If there is a need for applying the multiplexing scheme to the MS, the AP stores the VoIP data packet in a multiplexing queue in step 707. If there is no need for applying the multiplexing scheme to the MS, the AP transfers the VoIP data packet to the transmission queue thereby the transmission queue stores the VoIP data packet in step 717.

The AP determines the number of selected VoIP data packets for multiplexing from among VoIP data packets stored in the multiplexing queue 'm' is less than a maximum packet number of VoIP data packets capable to be multiplexed 'M' in step 709. If the m is less than the M, the AP determines whether there is a VoIP data packet which is not yet selected from among appropriate VoIP data packets to be generated as a multiplexing VoIP data packet in the multiplexing queue in step 711. The appropriate VoIP data packets may be selected based on a priority of each data packet. For example, a relatively high priority may be allocated to a VoIP data packet to be retransmitted, and a VoIP data packet which has been stored for a relatively long time in the multiplexing queue.

If there is the VoIP data packet which is not yet selected from among appropriate VoIP data packets to be generated as the multiplexing VoIP data packet in the multiplexing queue, the AP increases m by 1 (m=m+1) in step 713.

Meanwhile, if the m is not less than the M, that is, the m is greater than or equal to the M, the AP generates a multiplexing VoIP data packet by multiplexing the VoIP data packets stored in the multiplexing queue in step 715.

If there is no VoIP data packet which is not yet selected from among appropriate VoIP data packets to be generated as the multiplexing VoIP data packet in the multiplexing queue, the AP generates the multiplexing VoIP data packet by multiplexing the VoIP data packets stored in the multiplexing queue in step 715.

The AP transfers the multiplexing VoIP data packet to the transmission queue thereby the transmission queue stores the multiplexing VoIP data packet in step 717. The AP multicasts the multiplexing VoIP data packet if the transmission queue stores the multiplexing VoIP data packet and unicasts the VoIP data packet if the transmission queue stores the VoIP data packet in step 719.

As not described in FIG. 7, it will be understood by those of ordinary skill in the art that the AP may retransmit a related VoIP data packet to an MS at any time upon receiving a negative acknowledgement message indicating that the MS has not successfully received a VoIP data packet from the MS.

Figure 8:
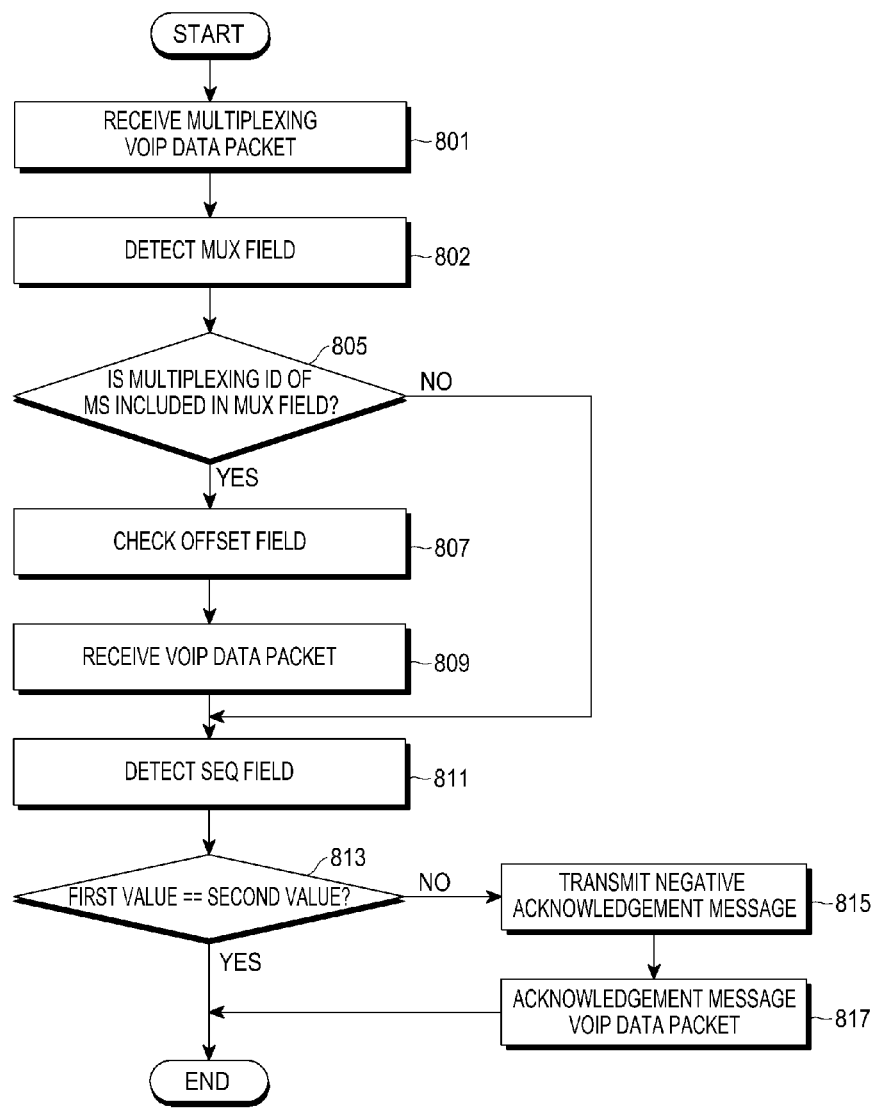
FIG. 8 is a flowchart illustrating a method for receiving a VoIP service in an MS in a WLAN system according to an embodiment of the present invention

FIG. 8 is a flowchart illustrating a method for receiving a VoIP service in an MS in a WLAN system according to an embodiment of the present invention.

Referring to FIG. 8, an MS receives a multiplexing VoIP data packet from an AP in step 801. The MS detects a MUX field included in the multiplexing VoIP data packet in step 803. The MS determines whether a multiplexing ID of the MS is included in the MUX field in step 805.

If the multiplexing ID of the MS is included in the MUX field, the MS checks an offset field targeting the MS in step 807. The MS receives a VoIP data packet, i.e., a RTP header and a voice data according to a value indicated by the offset field in step 809. If the multiplexing ID of the MS is not included in the MUX field, the MS detects an SEQ field included in the multiplexing VoIP data packet in step 811. The MS determines whether a RTP sequence number of a VoIP data packet which the AP has transmitted to the MS, i.e., the first value is equal to a RTP sequence number of a VoIP data packet which the MS has lastly received, i.e., the second value in step 813.

If the first value is not equal to the second value, the MS transmits a negative acknowledgement message indicating that the MS has not successfully received the VoIP data packet to the AP in step 815. The MS receives a VoIP data packet which the AP has retransmitted in step 817.

As not described in FIG. 8, it will be understood by those of ordinary skill in the art that the MS receives a RTP header and voice data upon receiving a VoIP data packet not a multiplexing VoIP data packet.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for providing a voice service by an access point (AP) in a wireless local access network (WLAN) system, the method comprising:
    generating a multiplexed voice data packet by performing a multiplexing operation on at least two voice data packets among received voice data packets;
    multicasting the multiplexed voice data packet to mobile stations (MSs) associated with the at least two voice data packets; and transmitting, to the MSs, voice data packets except for the voice data packets that are generated as the multiplexed voice data packet among the received voice data packets.

2. The method of claim 1, wherein generating the multiplexed voice data packet by performing the multiplexing operation on the at least two voice data packets comprises generating the multiplexed voice data packet by performing the multiplexing operation if a number of voice service calls that are provided by the AP is greater than or equal to a threshold of a voice service call number.

3. The method of claim 1, wherein the voice data packets that are generated as the multiplexed voice data packet comprise voice data packets targeting MSs mapped to identifiers (IDs) of the MSs included in a multiplexing list, and the IDs of the MSs included in the multiplexing list comprise IDs of the MSs to which a data packet multiplexing operation is applied.

4. The method of claim 1, further comprising:
detecting whether an MS joins a multiplexed voice data packet generation upon receiving a voice service request from the MS; and
if the MS joins the multiplexed voice data packet generation, including an identifier (ID) of the MS in a multiplexing list including IDs of the MSs to which a data packet multiplexing operation is applied.

5. The method of claim 4, further comprising:
indicating the MS that the ID of the MS is deleted from the multiplexing list upon detecting that the voice service for the MS is terminated.

6. The method of claim 1, wherein the multiplexed voice data packet includes an internet protocol (IP) field, a user datagram protocol (UDP) field, a sequence field, a multiplexing field, and a real time protocol (RTP) field and a voice data field corresponding to each of the at least two voice data packets, and
wherein the IP field includes an IP header of the multiplexed voice data packet, the UDP field includes a UDP header of the multiplexed voice data packet, the sequence field includes a RTP sequence number of a voice data packet which is lastly transmitted to MSs included in a multiplexing list, the multiplexing field is used for distinguishing RTP fields and voice data fields behind the multiplexing field, the RTP field includes a RTP header included in a related voice data packet, and the voice data field includes a voice data included in the related voice data packet.

7. The method of claim 1, wherein the multicasting operation has a priority higher than priorities applied to other transmission operations.

8. The method of claim 1, wherein multicasting the multiplexed voice data packet to the MSs associated with the at least two voice data packets comprises multicasting the multiplexed voice data packet to the MSs associated with the at least two voice data packets using a arbitration inter-frame space number (AIFSN) set to an access categry_voice (AC_VO) indicating that an access category is a voice service, a contention window minimum (CWmin) value, or a contention window maximum (CWmax) value, and
wherein the CWmin value and the CWmax value are set to zero and used upon performing a backoff operation.

9. A method for receiving a voice service by a mobile station (MS) in a wireless local access network (WLAN) system, the method comprising:
receiving a multiplexed voice data packet from an access point (AP),
wherein the multiplexed voice data packet is generated, at the AP, by performing a multiplexing operation on at least two voice data packets among received voice data packets, and multicast by performing a multicast operation, and
wherein voice data packets except for the voice data packets that are generated as the multiplexed voice data packet among the received voice data packets are transmitted to the MSs.

10. The method of claim 9, wherein the multiplexed voice data packet is generated, at the AP, by performing the multiplexing operation if a number of voice service calls that are provided by the AP is greater than or equal to a threshold of a voice service call number.

11. The method of claim 9, wherein the voice data packets that are generated as the multiplexed voice data packet are voice data packets targeting MSs mapped to identifiers (IDs) of the MSs included in a multiplexing list, and the IDs of the MSs included in the multiplexing list are IDs of the MSs to which a data packet multiplexing operation is applied.

12. The method of claim 9, further comprising:
transmitting a voice service request to the AP;
determining whether the MS joins a multiplexed voice data packet generation after transmitting the voice service request; and
transmitting the determined result to the AP such that the AP detects whether the MS joins the multiplexed voice data packet generation, and includes an identifier (ID) of the MS in a multiplexing list including IDs of the MSs to which a data packet multiplexing operation is applied according to the detected result.

13. The method of claim 12, further comprising:
indicating the AP that the voice service is terminated upon detecting that the voice service is terminated such that the AP deletes the ID of the MS from the multiplexing list.

14. The method of claim 10, wherein the multiplexed voice data packet includes an internet protocol (IP) field, a user datagram protocol (UDP) field, a sequence field, a multiplexing field, and a real time protocol (RTP) field and a voice data field corresponding to each of the at least two voice data packets, and
wherein the IP field includes an IP header of the multiplexed voice data packet, the UDP field includes a UDP header of the multiplexed voice data packet, the sequence field includes a RTP sequence number of a voice data packet which is lastly transmitted to MSs included in a multiplexing list, the multiplexing field is used for distinguishing RTP fields and voice data fields behind the multiplexing field, the RTP field includes a RTP header included in a related voice data packet, and the voice data field includes a voice data included in the related voice data packet.

15. The method of claim 10, wherein the multicasting operation has a priority higher than priorities applied to other transmission operations.

16. The method as claimed in claim 9, wherein the multicast operation includes an operation of multicasting the multiplexed voice data packet to the MSs associated with the at least two voice data packets using a arbitration inter-frame space number (AIFSN) set to an access categry_voice (AC_VO) indicating that an access category is a voice service, a contention window minimum (CWmin) value, or a contention window maximum (CWmax) value, and
wherein the CWmin value and the CWmax value are set to zero and used upon performing a backoff operation.

17. An access point (AP) in a wireless local access network (WLAN) system, the AP comprising:
a multiplexing block configured to generate a multiplexed voice data packet by performing a multiplexing operation on at least two voice data packets among received voice data packets; and
a transmission block configured to multicast the multiplexed voice data packet to mobile stations (MSs) associated with the at least two voice data packets,
wherein the transmission block multicasts the multiplexed voice data packet and transmits voice data packets except for the voice data packets that are generated as the multiplexed voice data packet among the received voice data packets to the MSs.

18. The AP of claim 17, wherein the multiplexing block is configured to generate the multiplexed voice data packet by performing the multiplexing operation if a number of voice service calls which are provided by the AP is greater than or equal to a threshold of a voice service call number.

19. The AP of claim 17, wherein the voice data packets that are generated as the multiplexed voice data packet comprise voice data packets targeting MSs mapped to identifiers (IDs) of the MSs included in a multiplexing list, and the IDs of the MSs included in the multiplexing list comprise IDs of the MSs to which a data packet multiplexing operation is applied.

20. The AP of claim 17, further comprising:
a multiplexing management block configured to detect whether an MS joins a multiplexed voice data packet generation upon receiving a voice service request from the MS; and
a multiplexing list block configured to include an identifier (ID) of the MS in a multiplexing list including IDs of the MSs to which a data packet multiplexing operation is applied if the MS joins the multiplexed voice data packet generation.

21. The AP of claim 20, wherein the transmission block is configured to indicate the MS that the ID of the MS is will be deleted from the multiplexing list upon detecting that the voice service for the MS is terminated.

22. The AP of claim 17, wherein multiplexed voice data packet includes an internet protocol (IP) field, a user datagram protocol (UDP) field, a sequence field, a multiplexing field, and a real time protocol (RTP) field and a voice data field corresponding to each of the at least two voice data packets, and
wherein the IP field includes an IP header of the multiplexed voice data packet, the UDP field includes a UDP header of the multiplexed voice data packet, the sequence field includes a RTP sequence number of a voice data packet which is lastly transmitted to MSs included in a multiplexing list, the multiplexing field is used for distinguishing RTP fields and voice data fields behind the multiplexing field, the RTP field includes a RTP header included in a related voice data packet, and the voice data field includes a voice data included in the related voice data packet.

23. The AP of claim 17, wherein the multicasting operation has a priority higher than priorities applied to other transmission operations.

24. The AP of claim 17, wherein the multicast operation includes an operation of multicasting the multiplexed voice data packet to the MSs associated with the at least two voice data packets using an arbitration inter-frame space number (AIFSN) set to an access categry_voice (AC_VO) indicating that an access category is a voice service, a contention window minimum (CWmin) value, or a contention window maximum (CWmax) value, and
wherein the CWmin value and the CWmax value are set to zero and used upon performing a backoff operation.

25. A mobile station (MS) in a wireless local access network (WLAN) system, the MS comprising:
a reception block configured to receive a multiplexed voice data packet from an access point (AP),
wherein the multiplexed voice data packet is generated, at the AP, by performing a multiplexing operation on at least two voice data packets among received voice data packets, and multicast by performing a multicast operation, and
wherein the voice data packets except for the voice data packets that are generated as the multiplexed voice data packet among the received voice data packets are transmitted to the MSs.

26. The MS of claim 25, wherein the multiplexed voice data packet is generated, at the AP, by performing the multiplexing operation if a number of voice service calls which are provided by the AP is greater than or equal to a threshold of a voice service call number.

27. The MS of claim 25, wherein the voice data packets which are generated as the multiplexed voice data packet are voice data packets targeting MSs mapped to identifiers (IDs) of the MSs included in a multiplexing list, and the IDs of the MSs included in the multiplexing list are IDs of the MSs to which a data packet multiplexing operation is applied.

28. The MS of claim 25, further comprising:
a transmission block configured to transmit a voice service request to the AP, and transmit the determined result to the AP after transmitting the voice service request, such that the AP detects whether the MS joins the multiplexed voice data packet generation and includes an identifier (ID) of the MS in a multiplexing list including IDs of the MSs to which a data packet multiplexing operation is applied according to the detected result.

29. The MS of claim 28, wherein the transmission block is configured to indicate the AP that the voice service is terminated upon detecting that the voice service is terminated, such that the AP deletes the ID of the MS from the multiplexing list.

30. The MS of claim 26, wherein multiplexed voice data packet includes an internet protocol (IP) field, a user datagram protocol (UDP) field, a sequence field, a multiplexing field, and a real time protocol (RTP) field and a voice data field corresponding to each of the at least two voice data packets, and
wherein the IP field includes an IP header of the multiplexed voice data packet, the UDP field includes a UDP header of the multiplexed voice data packet, the sequence field includes a RTP sequence number of a voice data packet which is lastly transmitted to MSs included in a multiplexing list, the multiplexing field is used for distinguishing RTP fields and voice data fields behind the multiplexing field, the RTP field includes a RTP header included in a related voice data packet, and the voice data field includes a voice data included in the related voice data packet.

31. The MS of claim 26, wherein the multicasting operation has a priority higher than priorities applied to other transmission operations.

32. The MS of claim 25, wherein the multicast operation includes an operation of multicasting the multiplexed voice data packet to the MSs associated with the at least two voice data packets using an arbitration inter-frame space number (AIFSN) set to an access categry_voice (AC_VO) indicating that an access category is a voice service, a contention window minimum (CWmin) value, or a contention window maximum (CWmax) value, and wherein the CWmin value and the CWmax value are set to zero and used upon performing a backoff operation.

* * * * *